United States Patent
Snow et al.

(10) Patent No.: US 8,416,734 B2
(45) Date of Patent: Apr. 9, 2013

(54) SYSTEM AND METHOD FOR JOINT VOICE AND DATA TRANSMISSION

(75) Inventors: Christopher Harris Snow, Kitchener (CA); Dinesh Kumar Arora, Waterloo (CA); Ayman Ahmed Abdel-Samad, Waterloo (CA); Nazih Almalki, Waterloo (CA); Ali Haldun Taner, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 220 days.

(21) Appl. No.: 12/848,720

(22) Filed: Aug. 2, 2010

(65) Prior Publication Data

US 2012/0027006 A1 Feb. 2, 2012

(51) Int. Cl.
  *H04L 12/66* (2006.01)
(52) U.S. Cl.
  USPC .......................................... 370/324; 370/352
(58) Field of Classification Search .................. 370/352, 370/324, 335, 337, 208; 375/262, 260, 341; 714/792; 710/33
See application file for complete search history.

(56) References Cited

U.S. PATENT DOCUMENTS

| | | | | |
|---|---|---|---|---|
| 6,023,783 A | * | 2/2000 | Divsalar et al. | 714/792 |
| 6,031,874 A | * | 2/2000 | Chennakeshu et al. | 375/262 |
| 6,798,852 B2 | * | 9/2004 | Khayrallah et al. | 375/341 |
| 2001/0031015 A1 | * | 10/2001 | West et al. | 375/260 |
| 2002/0057661 A1 | * | 5/2002 | Raith | 370/337 |
| 2003/0086366 A1 | * | 5/2003 | Branlund et al. | 370/208 |
| 2004/0181618 A1 | * | 9/2004 | Dottling et al. | 710/33 |
| 2004/0240566 A1 | | 12/2004 | Sebire et al. | |
| 2009/0201892 A1 | | 8/2009 | Guiriec et al. | |
| 2011/0211561 A1 | * | 9/2011 | Kiran et al. | 370/335 |

FOREIGN PATENT DOCUMENTS

WO WO2010021947 A1 2/2010

OTHER PUBLICATIONS

PCT International Search Report and Written Opinion, PCT/CA2010/001307, Mar. 14, 2011.

* cited by examiner

*Primary Examiner* — Melanie Jagannathan
*Assistant Examiner* — Parth Patel
(74) *Attorney, Agent, or Firm* — Quarles & Brady LLP

(57) ABSTRACT

A method for multiplexing voice and data communication using a communications network is presented. In the method, at least one voice bit from a voice bit stream is retrieved, and at least one data bit from at least one data bit stream is retrieved. When the voice bit stream is not in a discontinuous transmission (DTX) period, the at least one voice bit and the at least one data bit are used to generate a modulated symbol. The method includes transmitting the modulated symbol using the communications network.

13 Claims, 9 Drawing Sheets

SYSTEM AND METHOD FOR JOINT VOICE AND DATA TRANSMISSION

BACKGROUND

The present invention relates generally to data transmission in mobile communication systems and, more specifically, to joint voice and data transmissions.

As used herein, the term "device" can refer to the terms "mobile station" (MS), "user agent" (UA), or "user equipment" (UE) which can include electronic devices such as fixed and mobile telephones, personal digital assistants (PDAs), handheld or laptop computers, smartphones, televisions and similar devices that have network communications capabilities. The terms may also refer to devices that have similar capabilities but that are not readily transportable, such as desktop computers, set-top boxes, IPTVs or network nodes. The term "MS" can also refer to any hardware or software component that can terminate a communication session that could include, but is not limited to, a Session Initiation Protocol (SIP) session. Also, the terms "mobile station", "MS", "user agent," "UA," "user equipment, "UE," and "node" might be used synonymously herein. Those skilled in the art will appreciate that these terms can be used interchangeably.

An MS may operate in a wireless communication network that provides data and/or voice communications. For example, the MS may operate in accordance with one or more of an Enhanced Universal Terrestrial Radio Access Network (E-UTRAN), Universal Terrestrial Radio Access Network (UTRAN), Global System for Mobile Communications (GSM) network, Evolution-Data Optimized (EV-DO), 3GSM, Enhanced Data rates for GSM Evolution (EDGE), GPRS/EDGE Radio Access Network (GERAN) and General Packet Radio Service (GPRS) technology. Some MSs may be capable of multimode operation where they can operate on more than one access network technology either on a single access network at a time or in some devices using multiple access technologies simultaneously.

In wireless telecommunications systems, transmission equipment in a base station transmits signals throughout a geographical region known as a cell. The base station comprises a scheduler for dynamically scheduling downlink traffic transmissions and allocating uplink traffic transmission resources among all MSs communicating with the base station on a number of timeslots. The functions of the scheduler include, among others, dividing the available air interface capacity between MSs, deciding the transport channel for each MS's transmissions, and monitoring allocation and system load.

Communication networks may implement circuit-switched (CS) and/or packet-switched (PS) communication protocols to provide various services. The different networks described above, for example, may be configured to provide various services to connected MSs. Some networks, for example, provide only PS services and cannot provide CS voice or other CS domain services. As such, an MS may be configured to connect to multiple network-types to access both PS and CS domain services.

In some cases, networks (e.g., GERAN) and connected MSs are configured to allow for the simultaneous communication of CS and PS-based communications. For example, dual-transfer mode (DTM) may be provided by GERANs to allow for CS voice and PS data transfers between, for example, a MS and a base station. Generally, there are two classes of DTM. The first DTM class includes multi-slot DTM. In multi-slot DTM voice (e.g., CS voice) and data (e.g., PS data) traffic are transmitted using separate timeslots of a TDMA frame. Accordingly, the voice and data communications are not transmitted simultaneously (or within the same timeslot). Instead, the voice and data traffic may be transmitted using timeslots of a TDMA frame. A second DTM class includes single-slot DTM. In single-slot DTM a combination of half-rate speech traffic channel and half-rate packet data are communicated via the network (see, for example, 3GPP TS 45.002). In that case, even though the voice and data traffic may be transmitted within the same timeslot, each type of data is treated separately and transmitted within the same time slot in alternating TDMA frames, as an example.

FIG. 1 is a block diagram illustrating the operation of existing DTM schemes. As shown in FIG. 1, the system includes two separate information paths. The first path is configured to process voice bits 50, while the second path is configured to process data bits 52. The voice bits may be generated by, for example, a speech encoder contained with an MS or other network communications equipment. In the voice path, voice bits 50 are processed by processing block 54. After processing, the processed voice bits are allocated to resource 56 for transmission. Similarly, in the data path, data bits 52 are processed by processing block 58. The data bits may be generated, for example, by a processor in the MS or other network communications equipment. After processing, the processed data bits are allocated to resource 60 for transmission. In existing systems, resources 56 and 60 are separate. The resources may be different bursts within the same timeslot, or may, in fact, be located in different timeslots or on different frequencies. Accordingly, in some network implementations, both the voice and data bits are processed separately, encoded separately, and transmitted using separate resources.

As such, existing DTM schemes multiplex data on separate resources: either on separate time slots (in the multi-slot DTM schemes), or in one time slot but in alternating TDMA frames (in the single-slot DTM case). Accordingly, in existing DTM implementations, voice and data traffic are treated separately and transmitted using separate resources. This behavior results in inefficient utilization of available network resources.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
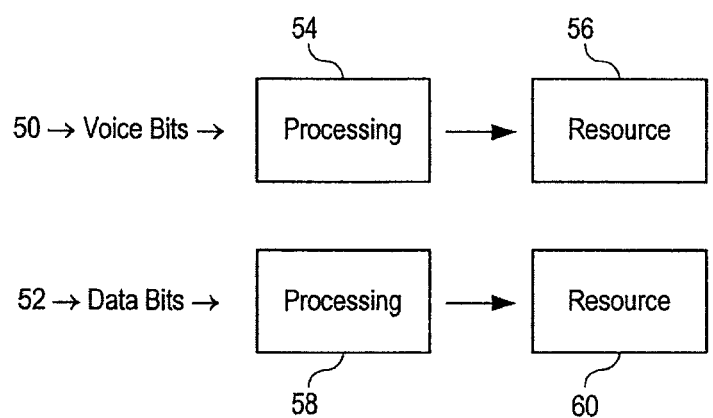
FIG. 1 is a block diagram illustrating the operation of existing DTM schemes.

The present invention relates generally to data transmission in mobile communication systems and, more specifically, to joint voice and data transmissions.

In some implementations, the present invention includes a method for multiplexing voice and data communication using a communications network. The method includes retrieving at least one voice bit from a voice bit stream, and retrieving at least one data bit from at least one data bit stream. The method includes, when the voice bit stream is not in a discontinuous transmission (DTX) period using the at least one voice bit and the at least one data bit to generate a modulated symbol. The method includes transmitting the modulated symbol using the communications network.

In other implementations, the present invention is a method for receiving multiplexed voice and data communications using a communications network. The method includes receiving a modulated symbol using the communications network, and when the voice bit stream is not in a discontinuous transmission (DTX) period, processing the modulated symbol to generate at least one voice bit and at least one data bit.

In other implementations, the present invention is a communications device comprising a processor configured to retrieve at least one voice bit from a voice bit stream, and retrieve at least one data bit from at least one data bit stream. The processor is configured to, when the voice bit stream is not in a discontinuous transmission (DTX) period, use the at least one voice bit and the at least one data bit to generate a modulated symbol. The processor is configured to transmit the modulated symbol using the communications network.

In other implementations, the present invention is a communications device comprising a processor configured to receive a modulated symbol using the communications network, and, when the voice bit stream is not in a discontinuous transmission (DTX) period, process the modulated symbol to generate at least one voice bit and at least one data bit.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

The present system provides an improved network and DTM scheme that allows for the transmission of voice and data traffic. Generally, the system operates by multiplexing both voice and data paths at the modulation or the channel coding level, as described below. In such a configuration, the present system enables the use of higher-quality full-rate voice codecs while still allowing for simultaneous data transmission with the use of a single timeslot, for example. In other implementations of the present system, similar techniques can also be employed using other combinations of voice codecs, channel coding schemes, and modulation schemes (e.g., those of the Enhanced General Packet Radio Service (EGPRS2) specifications).

Figure 2:
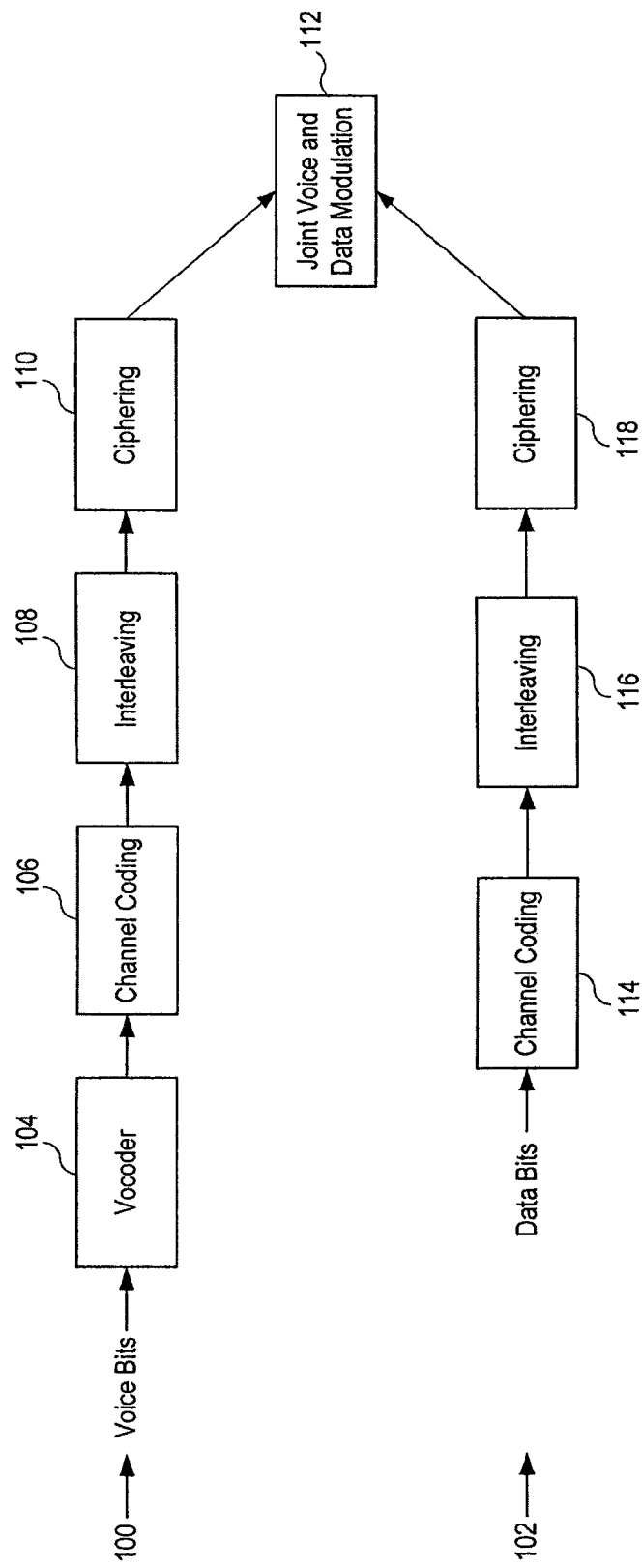
FIG. 2 is a block diagram illustrating an example voice and data multiplexing scheme operating in accordance with the present system.

FIG. 2 is a block diagram illustrating an example voice and data multiplexing scheme operating in accordance with the present system. Using the scheme, the voice and data paths are multiplexed at the modulation stage before transmission via a network (e.g., a GERAN). In such an implementation, the corresponding receiver (e.g., the device that will be receiving the multiplexed communication) processing chain is similarly modified in order to extract the two separate paths of information (e.g., the voice bits and data bits) from the single, multiplexed communication. Accordingly, the receiver receives a multiplexed symbol and uses an appropriate demultiplexing scheme to extract separate voice and data bit streams from the multiplexed symbol. The receiving system may have several different configurations. For example, the receiver may perform symbol-by-symbol de-multiplexing (to separate the two streams one symbol at a time), or perform joint detection of the voice and data streams (decide on both at the same time), for example.

The present multiplexing scheme may be implemented by any communications device configured to communicate using a communications network. For example, communication devices such as mobile stations, base stations, or other network components may each be configured to implement the present multiplexing scheme for performing joint transmission of voice and data and for receiving and processing multiplexed voice and data communications.

Referring to FIG. 2, the multiplexing system includes two paths, voice path 100 and data path 102 and may be implemented by the MS, base station, or other components of a communications network. In the multiplexing system, voice path 100 receives input voice bits, processes the incoming voice bits, and transmits an output to joint voice and data modulator 112. The voice bits may be generated, for example, by an audio processing system or speech encoder (e.g., element 104 on FIG. 2) installed within an MS. In the present system, voice path 100 may be configured to implement a conventional series of processing steps for voice data prior to modulation. For example, voice path 100 may include vocoder 104, channel coding 106, interleaving 108 and ciphering 110 as called for in, for example, existing Gaussian Minimum Shift Keying (GMSK) modulated voice transmission for GSM. After processing the incoming voice bits, voice path 100 transmits output bits to the input of joint voice and data modulator 112 at the rate of 1 bit per symbol.

Still referring to FIG. 2, the present multiplexing system includes data path 102 that receives input data bits, processes the incoming data bits, and also transmits an output to joint voice and data modulator 112. The data bits may be generated, for example, by one or more data processing systems within an MS or other communications network component. Data path 102 may be configured to implement channel coding 114, interleaving 116, and ciphering 118 as used with Quadrature Phase-Shift Keying (QPSK) modulation and coding schemes in EGPRS2. Data path 102 generates output bits at the input of joint voice and data modulator 112 at the rate of 2 bits per symbol.

After receiving the output from voice path 100 (e.g., 1 voice bit) and data path 102 (e.g., 2 data bits), joint voice and data modulator 112 can perform modulation of both paths of input data to generate an output that is used for transmissions from an MS to a base station and vice versa. The output from joint voice and data modulator 112 may, for example, be transmitted to a communication subsystem (e.g., a radio transmission system) within an MS or other network components for transmission via an antenna. In some cases, the modulated symbol that is outputted by joint voice and data path 112 could be transmitted within a single burst of a timeslot allocated for transmissions on the communications network.

Figure 3:
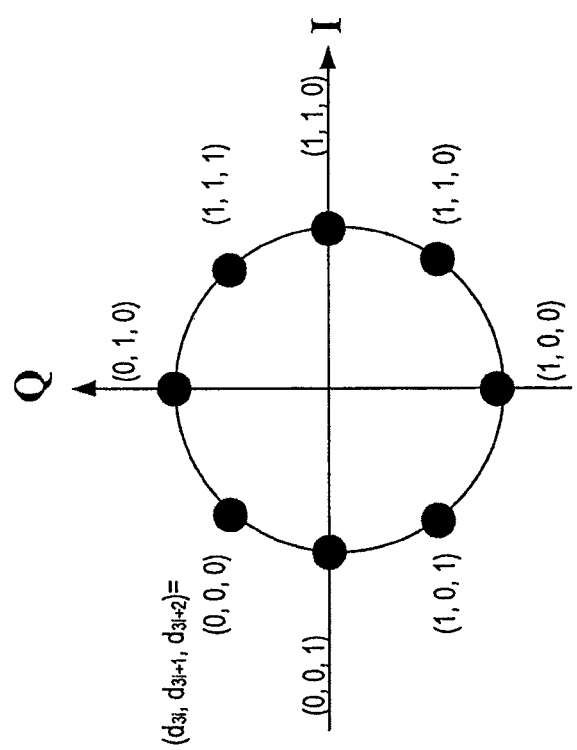
FIG. 3 illustrates a candidate constellation for modulating the three bits received from the voice path and the data path shown in FIG. 2.

In one particular implementation, after receiving the processed voice and data bits, joint voice and data modulator 112 is configured to use a standard GERAN 8PSK constellation when performing modulation for mapping both voice and data bits, as described below. The standard GERAN 8PSK constellation may be used because in one example implementation joint voice and data modulator 112 receives a total of three bits from voice path 100 and data path 102 (one bit from voice path 100 for every two bits from data path 102). In other implementations, however, where either of voice path 100 and data path 102 generate a differing number of output bits, an alternative constellation or other modulation scheme may be used. For example, FIG. 3 illustrates a candidate constellation for modulating the three bits received from voice path 100 and data path 102 shown in FIG. 2. Referring to FIG. 3, the single bits received from voice path 100 can be mapped onto the $d_{3i}$ bit of the constellation (this bit is the most protected in this particular constellation). Simultaneously, the two additional bits in each symbol generated by data path 102 can be mapped on to the $d_{3i+1}$ and $d_{3i+2}$ bits for carrying data. When processing a received transmission that is multiplexed in accordance with the present system, the receiving device uses the same constellation (e.g., a GERAN 8PSK constellation) to demultiplex the received signal to access the transmitted data (e.g., including joint voice and data communications).

In this implementation, if at any time voice communications are in a discontinuous transmission (DTX) period (so voice path 100 generates no data), then all three bits allocated for modulation by joint voice and data modulator 112 can be used to transmit data, either by using two separate data blocks (one with two bits/symbol and the other with one bit/symbol), or by using a single data block with three bits per symbol, for example.

Figure 4:
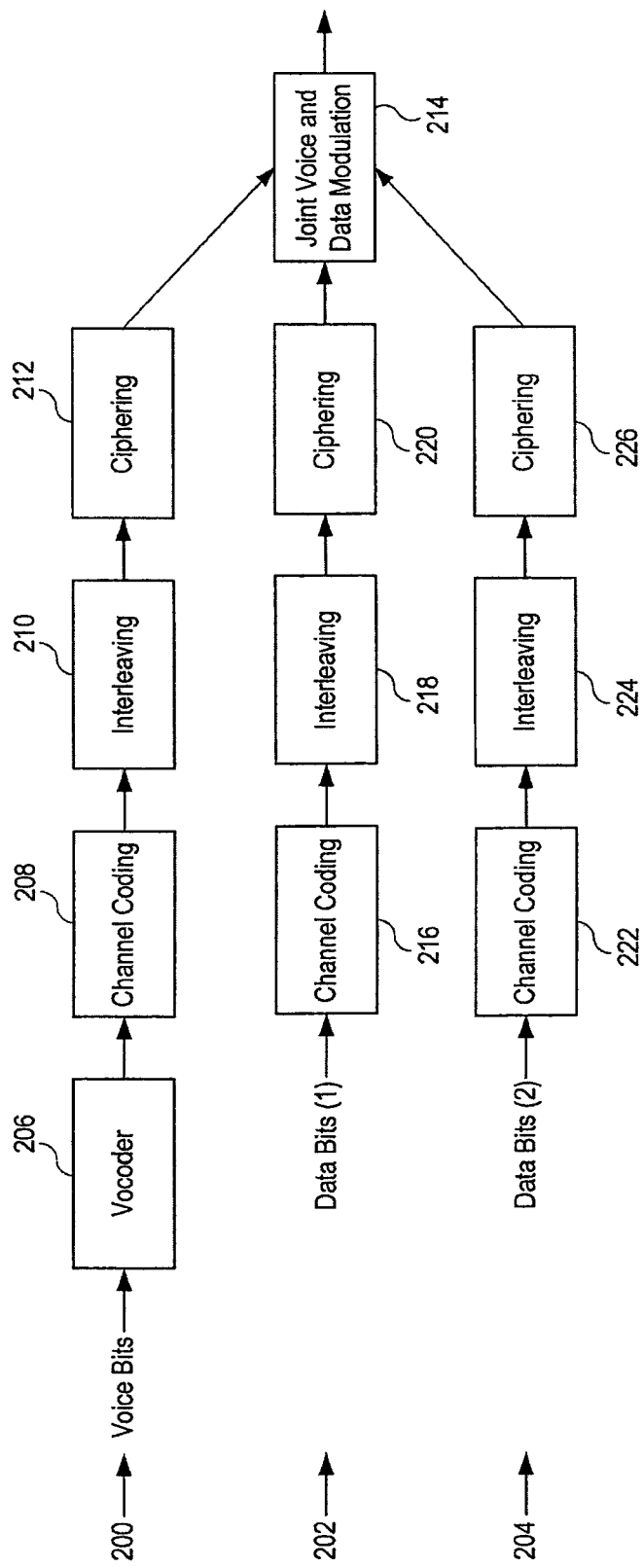
FIG. 4 is a block diagram showing an alternative voice and data multiplexing scheme incorporating a single voice path and two data paths.

FIG. 4 is a block diagram showing an alternative voice and data multiplexing scheme incorporating a single voice path and two data paths. As shown in FIG. 4, if, for example, the use of the EGPRS2 channel coding methods is not desired, an alternate approach can be used. In the example shown in FIG. 4, the joint voice and data modulation scheme is configured for modulation of three separate bit paths—a voice path and two separate data paths.

Referring to FIG. 4, voice path 200 may be configured to use the same voice codec 206, channel coding 208, interleaving 210 and ciphering 212 as called for in, for example, legacy GMSK modulated voice transmission for GSM. After processing, voice path 200 generates output at the input of joint voice and data modulator 214 at a rate of 1 bit per symbol.

Data path 202 may be configured to use channel coding 216, interleaving 218 and ciphering 220 as called for in, for example, GMSK modulation and coding schemes for GPRS/EGPRS, e.g., the channel coding schemes CS1-4 or MCS1-4. Data path 202 generates output at the input of joint voice and data modulator 214 at a rate of 1 bit per symbol.

Like data path 202, data path 204 may be configured to also use channel coding 222, interleaving 224 and ciphering 226 as called for in, for example, GMSK modulation and coding schemes, e.g., the channel coding schemes CS1-4 or MCS1-4. Data path 204 also generates output at the input of joint voice and data modulator 214 at a rate of 1 bit per symbol.

After receiving inputs from voice path 200, data path 202 and data path 204, joint voice and data modulator 214 may be configured to use a standard GERAN 8PSK constellation (again, as illustrated in FIG. 3) for performing modulation. For example, the bits generated by voice path 200 may be mapped onto the $d_{3i}$ bit as shown in FIG. 3. Simultaneously, the two additional bits in each symbol ($d_{3i+1}$ and $d_{3i+2}$) can be used to carry bits from the data paths. For example, data path 202 may be mapped onto the $d_{3i+1}$ bits while data path 204 may be mapped onto the $d_{3i+2}$ bits.

In an alternative implementation, for improved performance, bits generated by the two data paths 202 and 204 may be mapped onto the $d_{3i+1}$ and $d_{3i+2}$ bits in an alternating fashion. For example, data path 202 may use the $d_{3i+1}$ for odd values of i and the $d_{3i+2}$ bit for even values of i, while the opposite mapping may be used to allocate bits generated by data path 204.

Note that in the example implementations shown in FIGS. 2 and 4, when creating each modulated symbol, the joint voice and data modulator receives the same number of bits from each of the available voice and data paths. In the example of FIG. 2, joint voice and data modulator 112 receives 1 bit from voice path 100 and 2 bits from data path 102. In the example of FIG. 4, joint voice and data modulator 214 receives 1 bit from voice path 200, 1 bit from data path 202 and 1 bit from data path 204. But by modifying the joint voice and data modulator to process a time-varying number of bits from each available path, the present system may be modified to process an arbitrary ratio of voice bits to data bits.

For example, with a higher-quality voice codec such as that for half-rate 8PSK modulated wide-band voice transmission, voice bits can be generated at a rate of 1.5 bits per symbol. In that case, by configuring the joint voice and data modulator to process 2 voice bits and 1 data bit at odd-numbered symbols, and 1 voice bit and 2 data bits at even numbered symbols, it is possible to modulate voice and data at a voice-to-data ratio of 1-to-1. In other implementations, it is possible to construct similar time-varying modulator input patterns to support arbitrary voice-to-data ratios.

Figure 5:
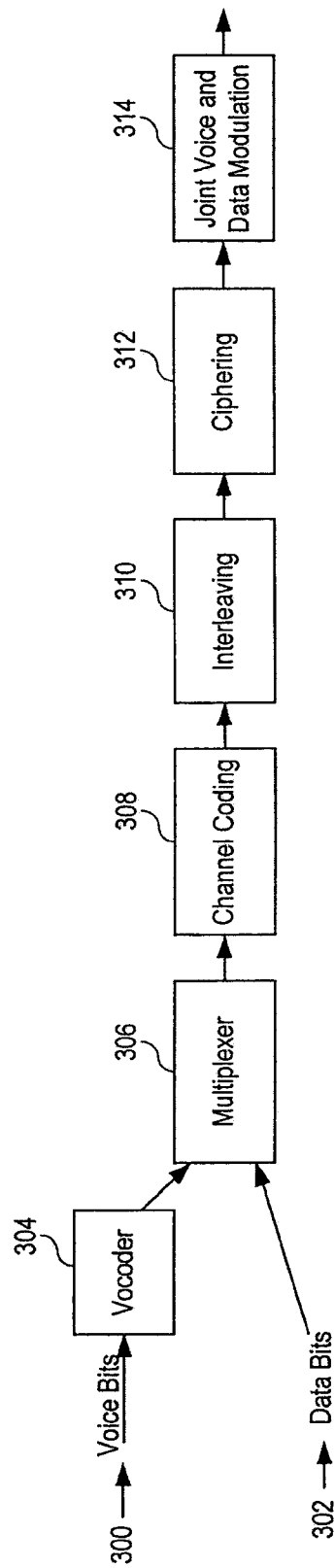
FIG. 5 is a block diagram showing an alternative voice and data multiplexing scheme using a multiplexer to modulate voice and data bits.

FIG. 5 is a block diagram showing an alternative voice and data multiplexing scheme using a multiplexer to modulate voice and data bits. Referring to FIG. 5, voice path 300 may be configured to use voice encoder (vocoder) 304 to process incoming voice bits. Vocoder 304 may be configured in accordance with narrowband adaptive multirate (NB-AMR) voice for GSM, for example. After vocoder 304 processes the voice bits, mutiplexer 306 combines vocoder 304 output bits (from voice path 300) and the data bit stream (from data path 302) at a ratio of 1-to-2 (i.e., multiplexing 1 bit from voice path 300 for every 2 bits from data path 302). Accordingly, the output stream bits $b_i$ from multiplexer 306 would be assigned to the vocoder input bits for (i mod 3=0) and to the data input bits for (i mod 3=1) and (i mod 3=2).

After multiplexing the output from multiplexer 306 and data path 302, the output is processed using channel coding 308, interleaving 310, ciphering 312 and joint voice and data modulator 314. In one example implementation, channel coding 308, interleaving 310, ciphering 312 and joint voice and data modulator 314 may be configured in accordance with the wideband AMR (WB-AMR) scheme designed for 8PSK voice for GSM. The signal output generated by joint voice and data modulator 314 may be 8PSK-modulated.

In some implementations of the present system, the data resources provided by this system may be dedicated to only one user (as opposed to "typical" GPRS packet data channels which can be shared between multiple users via the temporary flow identity (TFI) and uplink state flag (USF) mechanisms). In some cases, the protocol-level aspects of the system can be implemented in similar fashion to existing single-slot DTM schemes. In that case, the single-slot DTM data channel may also be a channel dedicated to one user.

The present system enables the use of high-quality full-rate voice codecs while still allowing for simultaneous data transmission with the use of a single timeslot. The present system may be implemented using other combinations of voice codecs, channel coding schemes, and modulation schemes (e.g., those of the EGPRS2 specifications).

In one specific implementation of the present system, therefore, the speech and packet data traffic channel encoded at 8PSK full rate carries both encoded speech and data simultaneously by allocating one bit in each symbol for speech and two bits in each symbol for data. Speech encoding and data encoding can be performed independently before the data streams are combined by mapping on symbols.

In the present implementation, channel encoding for speech can be done as specified for TCH/FS and TCH/EFS (see, for example 3GPP TS 45.003 subclauses 3.1.1 ... 3.1.3) or as specified for TCH/AFS (3GPP TS 45.003 subclauses 3.9.1.1 ... 3.9.1.4, 3.9.2.1 ... 3.9.2.3, 3.9.3.1 ... 3.9.3.2, 3.9.4.1 ... 3.9.5.4, 3.9.5.1 ... 3.9.5.4) or as specified for TCH/WFS (3GPP TS 45.003 subclauses 3.14.1 ... 3.14.4.5)

After interleaving, the blocks of coded data can be mapped in a first stage according to the following rule:

$$e(B,j)=i(B,j) \text{ and } e(B,59+j)=i(B,57+j) \text{ for } j=0, 1, \ldots, 56$$

and $$e(B,57)=hl(B) \text{ and } e(B,58)=hu(B)$$

In that case, the two bits, labelled hl(B) and hu(B) on burst number B can be flags used for an indication of control channel signaling. For each TCH/FS block not stolen for signaling purposes:

hu(B)=0 for the first 4 bursts (indicating status of even numbered bits)

hl(B)=0 for the last 4 bursts (indicating status of odd numbered bits)

For the use of hl(B) and hu(B) when a speech frame is stolen for signaling purposes see 3GPP TS 45.003 subclause 4.2.5.

Concatenating the encoded bursts results in an encoded speech frame of length 464 bits {PS(0) ... PS(463)}.

For data encoding in the uplink, if the message delivered to the encoder does not include a Piggy-backed Ack/Nack (PAN), the message may have a fixed size of 380 information bits {d(0), d(1), ..., d(379)}. If, however, the message delivered to the encoder includes a PAN, the message may have a fixed size of 405 information bits {d(0), d(1), ..., d(404)}. Note that the presence of the PAN can be indicated by the PANI field in the header (see 3GPP TS 44.060).

The message is, accordingly, separated into the following parts:

$$h(k)=d(k) \text{ for } k=0, \ldots, 28$$

$$i(k-29)=d(k) \text{ for } k=29, \ldots, 379$$

And if a PAN is included:

$$pn(k-380)=d(k) \text{ for } k=380, \ldots, 404$$

The header {h(0), ..., h(28)} may be coded as defined in 3GPP TS 45.003 subclause 5.1a.1.1, with N=29, resulting in a block of 111 bits, {C(0), ..., C(110)}.

The code may then be punctured in such a way that the coded bits {C(37*k+36) for k=0, ..., 2} are not transmitted. This results in a block of 108 bits, {hc(0), ..., hc(107)}.

For data coding, the data, {i(0), ..., i(349)}, may be coded as defined in 3GPP TS 45.003 subclause 5.1a.1.2, with N=350, resulting in a coded block of 1104 bits, {C(0), ..., C(1103)}.

The coded block can then be punctured depending on the value of the CPS field as defined in 3GPP TS 44.060. Two puncturing schemes named P1 or P2 can be applied in such a way that the coded bits shown Table 1 in are punctured.

TABLE 1

| | Always punctured | Punctured only if a PAN is included |
|---|---|---|
| P1 | C(27 * k + j) for k = 0, ..., 51, j = 5, 8, 11, 14, 17, 20, 23 and 26 | C(27 * k) for k = 0, ..., 51; and C(27 * k + 10) for k = 0, 1, 3, 5, 7, 9, 11, 13, 14, 16, 18, 20, 22, 24, 26, 27, 29, 31, 33, 35, 37, 39, 40, 42, 44, 46, 48 and 50 |

TABLE 1-continued

| Always punctured | Punctured only if a PAN is included |
|---|---|
| P2 C(27 * k + j) for k = 0, . . . , 51, j = 2, 4, 6, 12, 13, 18, 22 and 24 | C(27 * k + 16) for k = 0, . . . , 51; and C(27 * k + 9) for k = 0, 2, 4, 6, 8, 10, 12, 13, 15, 17, 19, 21, 23, 25, 26, 28, 30, 32, 34, 36, 38, 39, 41, 43, 45, 47, 49 and 51 |

If a PAN is not included, the result is a block of 820 bits, {c(0), . . . , c(819)}. If, however, a PAN is included, the result is a block of 795 bits, {c(0), . . . , c(794)}.

For PAN coding, the PAN {pn(0), . . . , pn(24)}, if included, can be coded as defined in 3GPP TS 45.003 subclause 5.1a.1.4, resulting in a block of 90 bits, {C(0), . . . , C(89)}. The code can be punctured in such a way that the following coded bits {C(11+k), C(17+k), C(23+k), C(32+k), C(41+k) for k=0, 45} are not transmitted. This can result in a block of 80 bits, {ac(0), . . . , ac(79)}.

When interleaving the header, the header, {hc(0), . . . , hc(107)}, can be interleaved as defined in 3GPP TS 45.003 subclause 5.1a.2.1, with NC=108 and a=23, resulting in a block of 108 bits, {hi(0), . . . , hi(107)}. If a PAN is not included, the following rule can apply:

$$dc(k)=c(k) \text{ for } k=0, \ldots, 819$$

If a PAN is included, data and PAN can be put together as one entity as described by the following rule:

$$dc(k)=ac(k) \text{ for } k=0, \ldots, 79$$

$$dc(k)=c(k-80) \text{ for } k=80, \ldots, 819$$

The block {dc(0), . . . , dc(927)} can be interleaved as defined in subclause 5.1a.2.1, with NC=928 and a=103, resulting in a block of 928 bits, {PD(0) PD(927)}.

In the case of data encoding on the downlink, if the message delivered to the encoder does not include a PAN, the message may have a fixed size of 380 information bits {d(0), d(1), . . . , d(379)}. If the message delivered to the encoder includes a PAN, however, the message may have a fixed size of 405 information bits {d(0), d(1), . . . , d(404). Note that the presence of the PAN may be indicated by the PANI field in the header (see 3GPP TS 44.060). The message may be separated into the following parts:

$$h(k)=d(k) \text{ for } k=0, \ldots, 29$$

$$i(k-30)=d(k) \text{ for } k=30, \ldots, 379$$

And if a PAN is included the message may be separated into the following parts:

$$pn(k-380)=d(k) \text{ for } k=380, \ldots, 404$$

For header coding, the header {h(0), . . . , h(26)} can be coded as defined in 3GPP TS 45.003 subclause 5.1a.1.1, with N=27, resulting in a block of 105 bits, {C(0), . . . , C(104)}. Some bits of the code can be repeated in the following way: hc(k)=C(k) for k=0, 1, . . . 104 and hc(105)=C(0), hc(106)=C(33), hc(107)=C(70). In that case, this results in a block of 108 bits, {hc(0), . . . , hc(107)}.

For data coding, the data part, {i(0), . . . , i(349)}, is coded as defined in 3GPP TS 45.003 subclause 5.1a.1.3, with N=350, resulting in a coded block of 1104 bits, {C(0), . . . , C(1103)}. The coded block can be punctured depending on the value of the CPS field as defined in 3GPP TS 44.060. Two puncturing schemes named P1 or P2 can be applied. The parameter values used for rate matching can be: swap=0.05, N=368, $N_{data}$=820 and $N_{data2}$=795. P1 puncturing can be generated according to 3GPP TS 45.003 5.1a.1.3.5. P2 (Type 1) puncturing can be generated according to 3GPP TS 45.003 5.1a.1.3.5.

If a PAN is not included, the result may be a block of 820 bits, {c(0), . . . , c(819)}. If a PAN is included, however, the result may be a block of 795 bits, {c(0), . . . , c(794)}.

For interleaving, the header, {hc(0), . . . , hc(107)}, can be interleaved as defined in 3GPP TS 45.003 subclause 5.1a.2.1, with $N_C$=108 and a=10, resulting in a block of 108 bits, {hi(0), . . . , hi(107)}. For data and PAN, if a PAN is not included, the following rule applies:

$$dc(k)=c(k) \text{ for } k=0, \ldots, 819$$

If, however, a PAN is included, data and PAN can be combined as one entity as described by the following rule:

$$dc(k)=ac(k) \text{ for } k=0, \ldots, 79$$

$$dc(k)=c(k-80) \text{ for } k=80, \ldots, 819$$

The block {dc(0), . . . , dc(955)} can be interleaved as defined in 3GPP TS 45.003 subclause 5.1a.2.1, with $N_C$=928 and a=173, resulting in a block of 928 bits {PD(0) PD(927)}.

For symbol mapping, the speech bits {$P_S$(0) $P_S$(464)} and data bits {$P_D$(0) $P_D$(927)} can be converted into 3-bit symbols {c(0) . . . c(463)} according to table 1 in 3GPP TS 45.004. The symbol c(k) may consist of $d_{3k}$=$P_S$(k), $d_{3k+1}$=$P_D$(k), $d_{3k+2}$=$P_D$(k+464) for k=0, 1, . . . , 463.

For mapping to a particular burst, the mapping may be performed as specified for the TCH/FS in 3GPP TS 45.003 subclause 3.1.4 with the exception that it is done by symbols instead of single bits.

Figure 6:
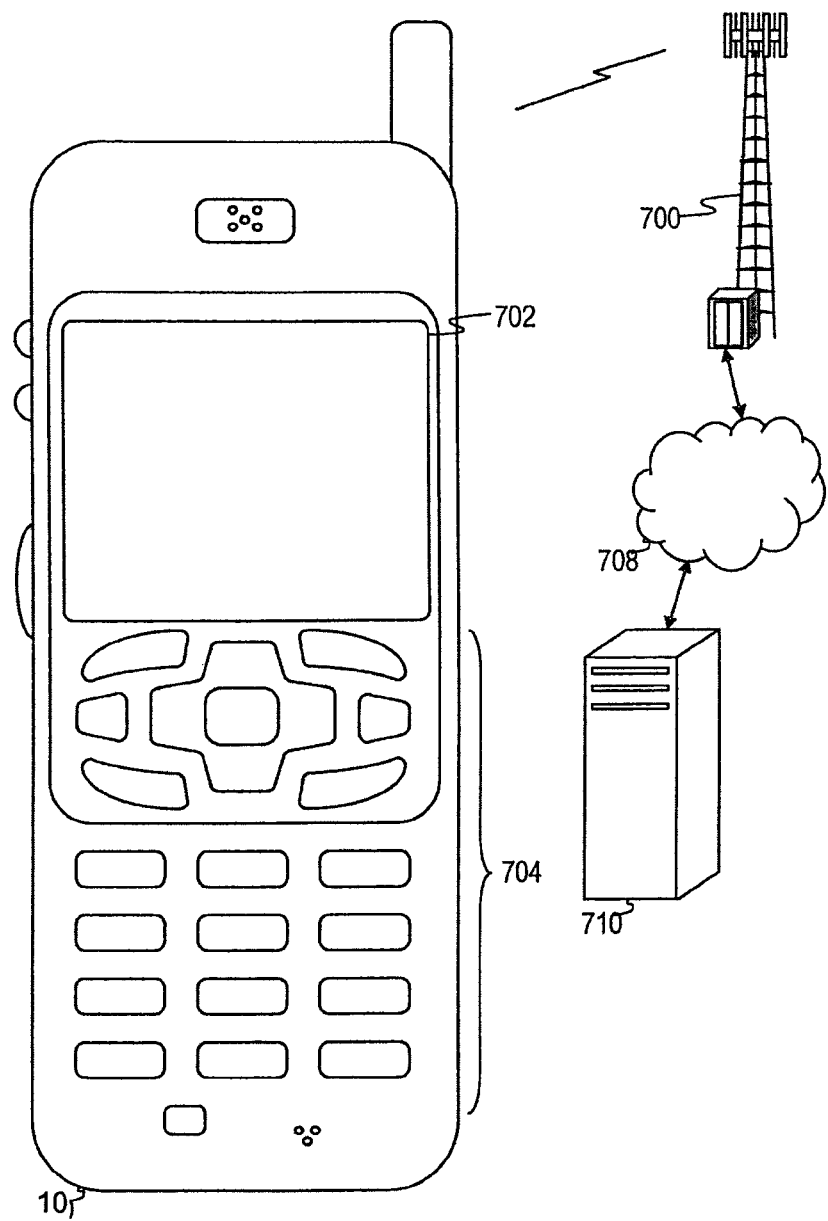
FIG. 6 is a diagram of a wireless communications system including an MS operable for some of the various embodiments of the disclosure.

FIG. 6 illustrates a wireless communications system including an embodiment of MS 10. MS 10 is operable for implementing aspects of the disclosure, but the disclosure should not be limited to these implementations. Though illustrated as a mobile phone, the MS 10 may take various forms including a wireless handset, a pager, a personal digital assistant (PDA), a portable computer, a tablet computer, a laptop computer. Many suitable devices combine some or all of these functions. In some embodiments of the disclosure, the MS 10 is not a general purpose computing device like a portable, laptop or tablet computer, but rather is a special-purpose communications device such as a mobile phone, a wireless handset, a pager, a PDA, or a telecommunications device installed in a vehicle. The MS 10 may also be a device, include a device, or be included in a device that has similar capabilities but that is not transportable, such as a desktop computer, a set-top box, or a network node. The MS 10 may support specialized activities such as gaming, inventory control, job control, and/or task management functions, and so on.

The MS 10 includes a display 702. The MS 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The MS 10 may present options for the user to select, controls for the user to actuate, and/or cursors or other indicators for the user to direct.

The MS 10 may further accept data entry from the user, including numbers to dial or various parameter values for configuring the operation of the MS 10. The MS 10 may further execute one or more software or firmware applications in response to user commands. These applications may configure the MS 10 to perform various customized functions in response to user interaction. Additionally, the MS 10 may be programmed and/or configured over-the-air, for example from a wireless base station, a wireless access point, or a peer MS 10.

Among the various applications executable by the MS 10 are a web browser, which enables the display 702 to show a web page. The web page may be obtained via wireless communications with a wireless network access node, a cell tower, a peer MS 10, or any other wireless communication network or system 700. The network 700 is coupled to a wired network 708, such as the Internet. Via the wireless link and the wired network, the MS 10 has access to information on various servers, such as a server 710. The server 710 may provide content that may be shown on the display 702. Alternately, the MS 10 may access the network 700 through a peer MS 10 acting as an intermediary, in a relay type or hop type of connection.

Figure 7:
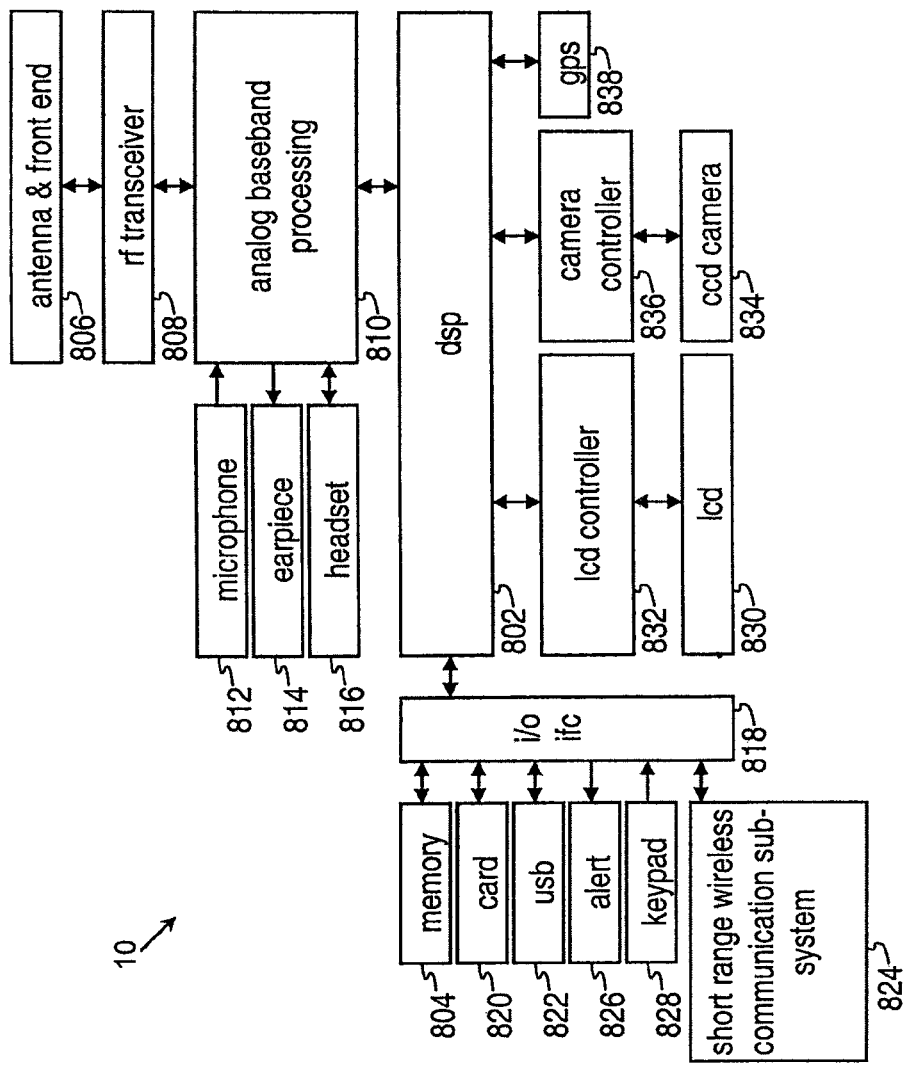
FIG. 7 is a block diagram of an MS operable for some of the various embodiments of the disclosure.

FIG. 7 shows a block diagram of the MS 10. While a variety of known components of MSs 10 are depicted, in an embodiment a subset of the listed components and/or additional components not listed may be included in the MS 10. The MS 10 includes a digital signal processor (DSP) 802 and a memory 804. As shown, the MS 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the MS 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the MS 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the MS 10 to send and receive information from a cellular network or some other available wireless communications network or from a peer MS 10. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog base band processing unit 810 may be combined in one or more processing units and/or application specific integrated circuits (ASICs).

The analog base band processing unit 810 may provide various analog processing of inputs and outputs, for example analog processing of inputs from the microphone 812 and the headset 816 and outputs to the earpiece 814 and the headset 816. To that end, the analog base band processing unit 810 may have ports for connecting to the built-in microphone 812 and the earpiece speaker 814 that enable the MS 10 to be used as a cell phone. The analog base band processing unit 810 may further include a port for connecting to a headset or other hands-free microphone and speaker configuration. The analog base band processing unit 810 may provide digital-to-analog conversion in one signal direction and analog-to-digital conversion in the opposing signal direction. In some embodiments, at least some of the functionality of the analog base band processing unit 810 may be provided by digital processing components, for example by the DSP 802 or by other central processing units.

The DSP 802 may perform modulation/demodulation, coding/decoding, interleaving/deinterleaving, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the MS 10 and may also enable the MS 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the MS 10 to communicate wirelessly with other nearby mobile devices and/or wireless base stations.

The input/output interface 818 may further connect the DSP 802 to the alert 826 that, when triggered, causes the MS 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the MS 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the MS 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the MS 10 to determine its position. Various other peripherals may also be included to provide additional functions, e.g., radio and television reception.

Figure 8:
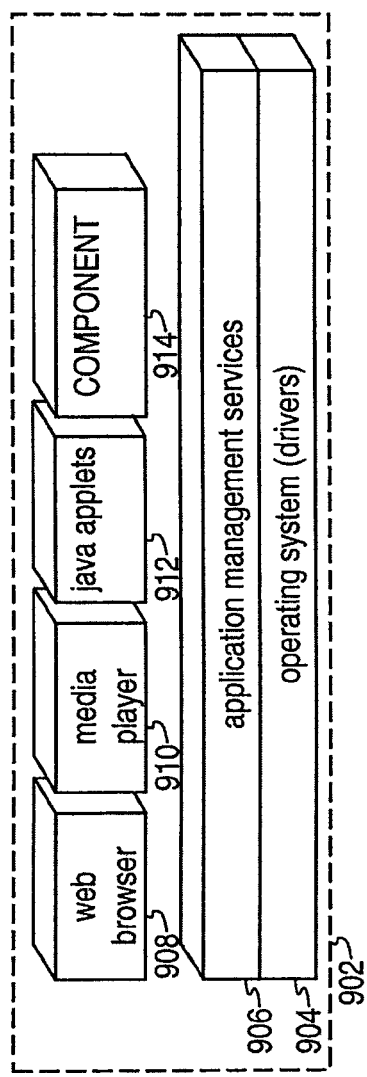
FIG. 8 is a diagram of a software environment that may be implemented on an MS operable for some of the various embodiments of the disclosure.

FIG. 8 illustrates a software environment 902 that may be implemented by the DSP 802. The DSP 802 executes operating system drivers 904 that provide a platform from which the rest of the software operates. The operating system drivers 904 provide drivers for the MS hardware with standardized interfaces that are accessible to application software. The operating system drivers 904 include application management services ("AMS") 906 that transfer control between applications running on the MS 10. Also shown in FIG. 8 are a web browser application 908, a media player application 910, and Java applets 912. The web browser application 908 configures the MS 10 to operate as a web browser, allowing a user to enter information into forms and select links to retrieve and view web pages. The media player application 910 configures the MS 10 to retrieve and play audio or audiovisual media. The Java applets 912 configure the MS 10 to provide games, utilities, and other functionality. A component 914 might provide functionality described herein.

Figure 9:
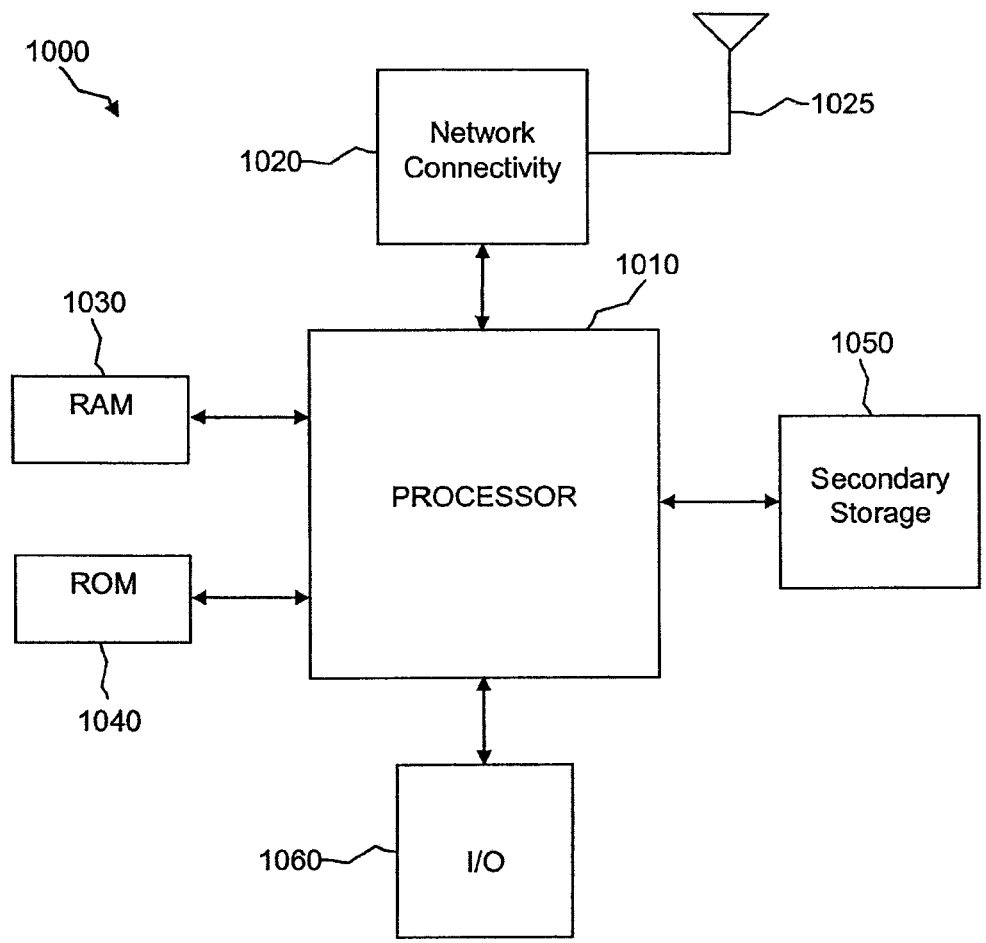
FIG. 9 is an illustrative general purpose computer system suitable for some of the various embodiments of the disclosure.

The MS 10, and other components described above might include a processing component that is capable of executing instructions related to the actions described above. FIG. 9 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by the processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the MS 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

To apprise the public of the scope of this invention, the following claims are made:

1. A method for multiplexing voice and data communication using a communications network, comprising:
   retrieving at least one data bit from at least one data bit stream;
   determining whether a voice bit stream is in a discontinuous transmission (DTX) period;
   when the voice bit stream is not in the DTX period:
     retrieving at least one voice bit from a voice bit stream, and
     using the at least one voice bit and the at least one data bit to generate a modulated symbol;
   when the voice bit stream is in the DTX period, using at least two data bits to generate the modulated symbol; and
   transmitting the modulated symbol using the communications network, wherein using the at least one voice bit and the at least one data bit to generate a modulated symbol includes using an eight phase shift keying (8PSK) constellation and wherein the at least one voice bit is allocated to a most-protected bit of the 8PSK constellation.

2. The method of claim 1, wherein the at least one data bit includes a first and second data bit and the first data bit is received from a first data bit stream and the second data bit is received from a second data bit stream.

3. A method for receiving multiplexed voice and data communications using a communications network, comprising:
   receiving a modulated symbol using the communications network;
   when a voice bit stream is not in a discontinuous transmission (DTX) period, processing the modulated symbol to generate at least one voice bit and at least one data bit; and
   when the voice bit stream is in the DTX period, processing the modulated symbol to generate at least two data bits, wherein processing the modulated symbol to generate at least one voice bit and at least one data bit includes using an eight phase shift keying (8PSK) constellation and wherein the at least one voice bit is allocated to a most-protected bit of the 8PSK constellation.

4. A communications device, comprising:
   a processor, the processor being configured to:
     retrieve at least one data bit from at least one data bit stream;
     determine whether a voice bit stream is in a discontinuous transmission (DTX) period;
     when the voice bit stream is not in the DTX period:
       retrieve at least one voice bit from a voice bit stream, and
       use the at least one voice bit and the at least one data bit to generate a modulated symbol;
     when the voice bit stream is in the DTX period, use at least two data bits to generate the modulated symbol; and
     transmit the modulated symbol using the communications network,
   wherein when the processor uses the at least one voice bit and the at least one data bit to generate a modulated symbol, the processor is configured to use an eight phase shift keying (8PSK) constellation and wherein the at least one voice bit is allocated to a most-protected bit of the 8PSK constellation.

5. The communications device of claim 4, wherein the at least one data bit includes a first and second data bit and the first data bit is received from a first data bit stream and the second data bit is received from a second data bit stream.

6. The communications device of claim 4, wherein the modulated symbol is transmitted within a burst of an allocated timeslot on the communications network.

7. The communications device of claim 4, wherein the communications device is a mobile station.

8. The communications device of claim 4, wherein the communications device is a network component.

9. A communications device, comprising:
   a processor, the processor being configured to:
     receive a modulated symbol using the communications network;
     when a voice bit stream is not in a discontinuous transmission (DTX) period, process the modulated symbol to generate at least one voice bit and at least one data bit; and
     when the voice bit stream is in the DTX period, process the modulated symbol to generate at least two data bits, wherein the processor is configured to use an eight phase shift keying (8PSK) constellation to process the modulated symbol and wherein the at least one voice bit is allocated to a most-protected bit of the 8PSK constellation.

10. The communications device of claim 9, wherein the communications device is a mobile station.

11. The communications device of claim 9, wherein the communications device is a network component.

12. A user equipment, comprising:
    a processor, the processor being configured to:
      retrieve at least one data bit from at least one data bit stream;

determine whether a voice bit stream is in a discontinuous transmission (DTX) period;
when the voice bit stream is not in the DTX period:
retrieve at least one voice bit from a voice bit stream, and
use the at least one voice bit and the at least one data bit to generate a modulated symbol;
when the voice bit stream is in the DTX period, use at least two data bits to generate the modulated symbol; and
transmit the modulated symbol using the communications network, wherein when the processor uses the at least one voice bit and the at least one data bit to generate a modulated symbol, the processor is configured to use an eight phase shift keying (8PSK) constellation and wherein the at least one voice bit is allocated to a most-protected bit of the 8PSK constellation.

13. A network component, comprising:
a processor, the processor being configured to:
receive a modulated symbol using the communications network;
when a voice bit stream is not in a discontinuous transmission (DTX) period, process the modulated symbol to generate at least one voice bit and at least one data bit; and
when the voice bit stream is in the DTX period, process the modulated symbol to generate at least two data bits, wherein the processor is configured to use an eight phase shift keying (8PSK) constellation to process the modulated symbol and wherein the at least one voice bit is allocated to a most-protected bit of the 8PSK constellation.

* * * * *